United States Patent

Fisher et al.

[11] 4,007,413
[45] Feb. 8, 1977

[54] CONVERTER UTILIZING LEAKAGE INDUCTANCE TO CONTROL ENERGY FLOW AND IMPROVE SIGNAL WAVEFORMS

[75] Inventors: Phil Dewey Fisher, Millington; Richard Howard Hock, Landing, both of N.J.

[73] Assignee: Bell Telephone Laboratories, Incorporated, Murray Hill, N.J.

[22] Filed: Dec. 8, 1975

[21] Appl. No.: 638,315

[52] U.S. Cl. .................................. 321/2; 321/45 R
[51] Int. Cl.² ..................................... H02M 3/335
[58] Field of Search ................ 321/2, 45 R, 43, 44

[56] References Cited

UNITED STATES PATENTS

| | | | |
|---|---|---|---|
| 3,161,837 | 12/1964 | Lloyd | 321/2 X |
| 3,196,335 | 7/1965 | Williams, Jr. | 321/2 |
| 3,242,415 | 3/1966 | King et al. | 321/45 R |
| 3,317,816 | 5/1970 | Wilting | 321/45 R |
| 3,524,990 | 8/1970 | Bajpai et al. | 321/12 |
| 3,806,792 | 4/1974 | Untamo | 321/45 R X |
| 3,978,393 | 8/1976 | Wisnet et al. | 321/2 |

OTHER PUBLICATIONS

"AC Power Amplifier using Single Switching Transistor", Digests of the Intermag Conference, Apr. 1970, p. 18.2.

*Primary Examiner*—William M. Shoop
*Attorney, Agent, or Firm*—Alfred G. Steinmetz

[57] ABSTRACT

A single-ended converter circuit combines a magnetic energy storage medium with an energy discharge path to simplify transformer design, improve transformer operating characteristics, and reduce induced electromagnetic interference. The concept is extended to self-oscillating, single-ended converters and a double-ended type is achieved by combining two single-ended converters with a single power transformer structure.

9 Claims, 7 Drawing Figures

CONVERTER UTILIZING LEAKAGE INDUCTANCE TO CONTROL ENERGY FLOW AND IMPROVE SIGNAL WAVEFORMS

BACKGROUND OF THE INVENTION

1. Field of the Invention

This invention is concerned with switching type power supplies and is directed to converter circuits having transformer isolation between the input and output circuits. It is concerned particularly with single-ended converters and is specifically applicable to forward type, single-ended converters which are self-oscillating.

2. Description of the Prior Art

Forward type or transformer coupled, single-ended converters are a well-known class of converter circuits. A discussion of its characteristics may be found in the text *Transistor Inverters and Converters*, by Thomas Roddam, D. Van Nostrand Co., Inc., Princeton, New Jersey (1963) First Edition. The forward type, single-ended converter is characterized by a source of DC voltage, a switching device coupling the DC voltage to the primary of a power transformer, and a rectifying diode coupling the secondary of the power transformer to a load to be energized. The rectifying diode is poled to conduct when the switching device in the primary conducts. Hence, current is applied to the load by transformer action when the switching device is conducting.

In contrast to the more familiar ringing choke type, single-ended converter, very little magnetic energy is stored in the power transformer. The forward type, single-ended converter has very good voltage regulation characteristics and is very economical in terms of circuit components needed since only one active switching device and its associated biasing circuitry is required.

In applications in which electromagnetic interference is particularly undesirable, the switching device of the forward type, single-ended converter must be operated with relatively long turn on and turn off times. At short turn on and turn off times the switching device generates significant electromagnetic interference in the secondary of the converter. Current conduction in the secondary is abruptly terminated by the rapid turn off of the switching device in the primary, and electromagnetic interference is generated in the secondary due to rapid back biasing of the output diode. The forward type, single-ended converter needs an output filter inductor since this circuit tends to generate more ripple in the output current than the corresponding ringing choke type converter.

It is therefore an object of the present invention to reduce the electromagnetic interference generated by fast rise times in the output current waveshapes in single-ended converters at high operational frequencies.

It is also an object of the invention to operate a forward type, single-ended converter without the necessity of a large filter inductor in the output circuit.

SUMMARY OF THE INVENTION

In accordance with the objectives of the invention, a forward type, single-ended converter embodiment is disclosed in which a magnetic energy storage medium is combined with a controlled energy discharge path to limit current decay in the output of the converter and thus significantly reduce the generated electromatic interference. In the particular embodiments disclosed herein, this magnetic energy storage medium is realized by creating significant leakage inductance in the power transformer of the converter. The power transformer of the single-ended converter comprises first and second series connected primary windings tightly coupled to each other. A secondary winding is very loosely coupled to the primary windings in order to introduce a significant leakage inductance between the primary and secondary windings. The first primary winding is energized by a voltage source in response to conduction in a switching device on the primary side of the converter. During this conduction energy is stored in the leakage inductance of the first primary winding. The leakage inductance is preferably large enough to store at least one-half of the applied input energy. A rectifying diode connected to the secondary winding is poled to conduct initially in response to the conduction of the switching device. The energy stored in the leakage inductance of the first primary winding is also stored in the leakage inductance of the second primary winding due to the tight coupling between the first and second primary windings. The induced voltage in the leakage inductance of the second primary winding biases an energy discharge control diode to conduct during the initial interval of the nonconduction period of the first primary winding. This discharge current is utilized to magnetically reset the leakage inductance for the next cycle of operation. This discharge current additionally extends the period of time during which the current in the output rectifying diode decays. During the conduction period of the switching device, one-half of the applied energy is stored in the leakage inductance. The other half of applied energy is applied to the load to be energized. During the reset interval following conduction of the switching device, one-half of the energy stored in the leakage inductance is applied to the load and the other half is returned to the energy source.

It is apparent from the foregoing that the high leakage inductance in combination with the energy discharge diode limits the rate at which current is turned off in the secondary winding. Hence, the reduced slope of the trailing edge of the current in the secondary winding reduces the electromagnetic interference generated by the converter circuit. An advantageous feature of the embodiment of the invention is that the large leakage inductance has a filtering action which replaces the need for a large filter inductor in the output of the converter circuit.

DETAILED DESCRIPTION

Figure 1:
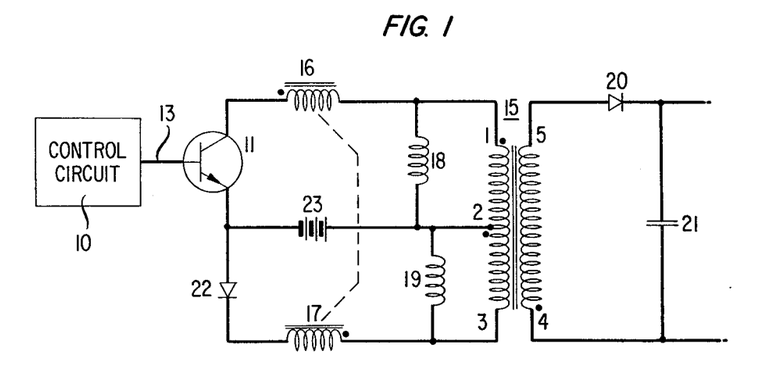
FIG. 1 discloses a forward type, single-ended converter embodying features illustrative of the invention.

A forward type, single-ended converter circuit of the driven mode type is shown in FIG. 1. This converter circuit is designed to efficiently convert DC voltage supplied by a battery from one level to an isolated and well regulated DC voltage at another level at the output of the circuit. The transformer of this circuit is designed to utilize magnetic energy storage and a controlled energy discharge path in accordance with the principles of the invention in order to minimize electromagnetic interference and limit ripple in the output current.

The advantageous features and the circuit operation depend upon the use of a coupled inductor on the primary side of the power transformer. This coupled inductor is shown by the windings 16 and 17 schematically shown in FIG. 1. The windings 16 and 17 are magnetically coupled to each other. This coupled inductor may comprise additional windings in addition to those of the transformer. It has been discovered, however, that additional discrete windings are not necessary and in the embodiment disclosed these windings are realized by utilizing a power transformer with very high leakage inductance between the primary and secondary windings. Hence, in the transformer 1 schematically shown in FIG. 1, the windings 1-2 and 2-3 on the primary side and the winding 4-5 on the secondary side represent the idealized windings of transformer 15. The windings 18 and 19 in parallel with windings 1-2 and 2-3, respectively, represent the magnetizing inductance of transformer 15. The windings 16 and 17 represent the leakage inductance of transformer 15. It is to be understood that the leakage inductances 16 and 17 schematically shown in FIG. 1 greatly exceed the normal leakage inductance of a transformer which would be normally found in the conventional forward type, single-ended converter. For example, the leakage inductance should be large enough to absorb at least one-half of the input energy applied to the transformer. The magnitude of the voltage drop across the leakage inductance 16 would normally equal the magnitude of the voltage drop across the transformer winding 1-2.

The leakage inductances shown schematically by windings 16 and 17 are due almost solely to the lack of coupling between the primary windings 1-2 and 2-3 and the secondary winding 4-5. The two primary windings 1-2 and 2-3 are very tightly coupled with each other. This tight coupling is achieved in the illustrative embodiment by a bifilar winding arrangement. This tight coupling is designed to eliminate as far as possible any leakage inductance between the windings 1-2 and 2-3.

Figure 2:
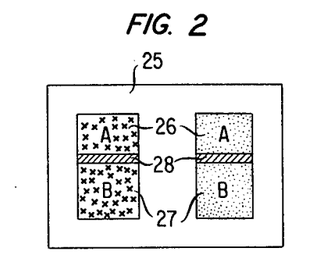
FIG. 2 schematically shows a transformer construction suitable to embody the features of the invention.

The embodiment of a transformer construction suitable for achieving the desired results of the invention is shown in cross section in FIG. 2 where the windings of the transformer are wound around the central core of a three-legged transformer core 25. The secondary winding 26 is separated from the two bifilar wound primary windings 27 by a dielectric spacer 28. This construction induces a very large leakage inductance between the primary and secondary windings. Because of the close coupling of the two segments of the primary winding, each primary winding has a separate leakage inductance component which is tightly coupled to the leakage inductance component of the adjoining winding. Hence, the two leakage inductances operate as two separate windings which are magnetically coupled to each other.

The advantages of the invention may be best understood by explaining the operation of the circuit of FIG. 1. A control circuit 10 which may be a straightforward driving circuit or controlled by a voltage regulation feedback circuit generates a bias signal to control the switching of transistor 11. For the purposes of explanation, assume that the control circuit has generated a positive pulse which it applies to the base electrode 13 to bias the transistor 11 into its conducting condition. As the transistor 11 is biased into its conducting condition, a circuit path is completed from the positive terminal of battery 23 through the winding 1-2, through the leakage inductance 16, and through the collector-emitter path of transistor 11 to the negative terminal of the battery 23. Hence, a ramp of current begins to flow through the winding 1-2. The current flowing through winding 1-2 induces a voltage in winding 2-3. The respective voltages may be ascertained from the polarity dot notations shown in FIG. 1. The dotted side of windings 1-2, 2-3, 16, and 17 is negative at this moment. It is apparent from the polarities shown that the diode 22 is back biased by the voltage of the leakage inductance 17 and winding 2-3 and no current flows through the winding 2-3. This initial ramp of current is shown by the waveform 30 in FIG. 3 which depicts the current occurring at the junction of windings 1-2 and 2-3. This initial ramp of current occurs during time interval $t_1$-$t_2$. This current flows through the winding 1-2, the leakage inductance 16, and through transistor 11. In response to this current flow, a voltage appears across the leakage inductance 16 and magnetic energy is stored therein. In this illustrative embodiment the voltage drop across the leakage inductance 16 is approximately equal to the voltage drop across the primary winding 1-2. This magnetic energy is coupled to the leakage inductance 17 and induces a voltage drop thereacross in accord with the polarity dot notation. It is apparent that no current flows therethrough inasmuch as the diode 22 is back biased.

In response to this ramp of current in the primary, shown by waveform 30, current flows in the output of the converter circuit through the rectifying diode 20 and charges the capacitor 21. The output current through the diode 20 is shown by waveform 40 in FIG. 3 and is a positive ramp for the time interval $t_1$-$t_2$. This current flows because the diode 20 is biased conducting in response to the polarity of the voltage drop across secondary winding 4-5.

Figure 3:
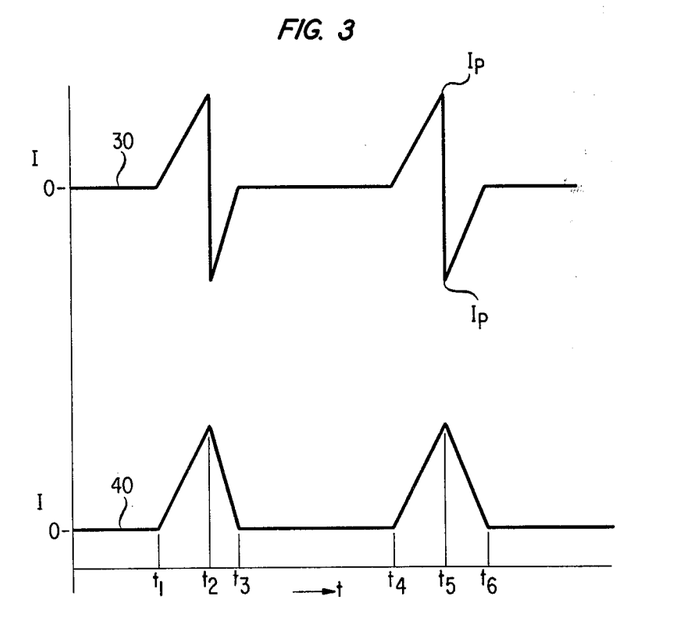
FIG. 3 discloses current waveforms useful in describing the operation of the converter circuit schematically shown in FIG. 1.

After some predetermined period of time, which is controlled by the control circuit 10, a negative signal is generated and applied to base electrode 13 to bias the transistor 11 nonconducting. When transistor 11 ceases to conduct, current flowing through winding 1-2 and through the leakage inductance 16 is abruptly terminated and the voltage across winding 1-2 and the leakage inductance 16 reverses its polarity. The polarity at the dots is now positive. The voltage across the coupled leakage inductance 17 and winding 2-3 also reverses its polarity in response thereto and the diode 22 is forward biased. The energy stored in the leakage inductance 17 produces a discharge current utilized to reset the leakage inductance. This is conducted via winding 2-3 back to the positive terminal of the battery source 23. This discharge current through the action of transformer 15 produces a decreasing ramp current in the output winding 4-5 which continues to forward bias diode 20 and permits part of the energy stored in the leakage inductance to appear as an output current charging the capacitor 21. The discharge current flowing through the leakage inductance 17 is shown by current waveform 30 during the time interval $t_2$-$t_3$ as it appears at the junction of windings 1-2 and 2-3. The corresponding decreasing output ramp current is shown by waveform 40 and appears during the time interval $t_2$-$t_3$. The discharge current flows for a finite time determined by the voltage of battery 23, the voltage across winding 2-3 as reflected from the output winding and by the peak current magnitude in winding 1-2 when the transistor 11 is biased nonconducting.

The decreasing output ramp current flowing in response to energy stored in the leakage inductance 17, limits the rate of decay of the output current and hence reduces the generated electromagnetic interference. In addition, by coupling the primary discharge current back to the positive terminal of battery 23, the efficiency of the converter is improved, inasmuch as energy stored in the leakage inductance need not be dissipated.

It is apparent from the foregoing description that by introducing significant leakage inductance between primary and secondary windings of a forward type, single-ended converter, and by constructing the transformer so that the leakage inductance controls conduction in a discharge path, the generated electromagnetic interference can be significantly reduced and the efficiency of the circuit improved. The only losses associated with leakage inductance would be due to the uncoupled leakage inductance between windings 1-2 and 2-3 which in the instant example is very small. The cycle of operation described in repetitive and the subsequent operation of the circuit may be deduced from examination of current waveforms 30 and 40 during the time interval $t_3$-$t_6$. The incidence of the significant leakage inductance also advantageously limits the ripple current which normally appears in the output current of a forward type single-ended converter without the need for a large filter inductor in this output circuit.

Figure 4:
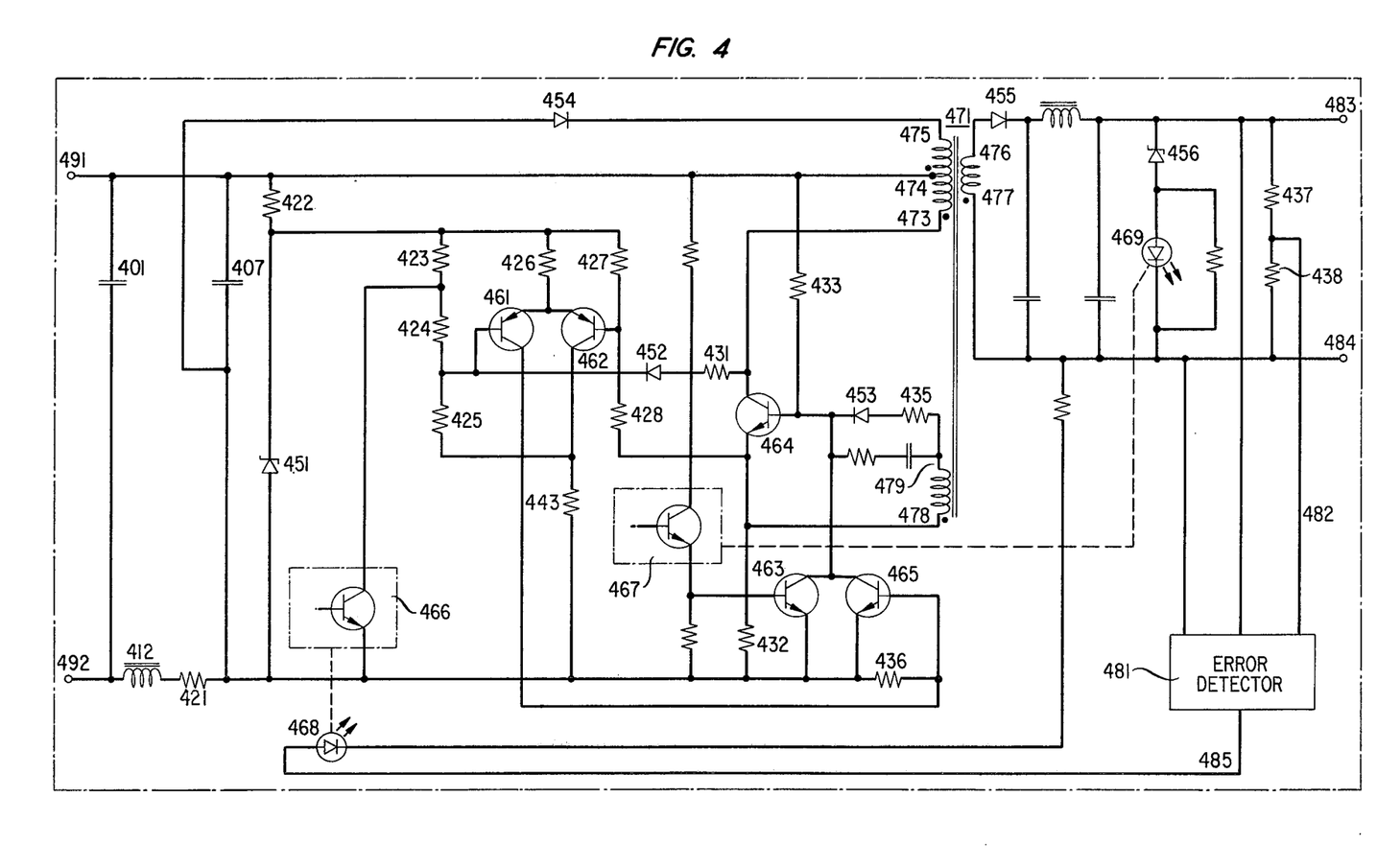
FIG. 4 discloses a schematic of a self-oscillating forward type, single-ended converter embodying features illustrative of the invention.

A forward type, single-ended, self-oscillating converter is disclosed in FIG. 4. The converter disclosed therein utilizes a transformer 471 whose primary windings are all bifilar wound with each other to achieve close coupling. The transformer is designed as disclosed in FIG. 2 to have an insulating spacer between the primary and secondary windings of the transformer to produce a large primary leakage inductance. Traditionally, regenerative type oscillatory circuits have been designed so as to minimize leakage inductance. The leakage inductance of the circuit of FIG. 4, however, represents a significant portion of the inductance of the transformer. In the traditional ringing choke type regenerative type oscillatory circuit undesirable parasitic leakage inductance is kept to a minimum. The energy stored in the inductance requires the addition of an energy dissipation or snubber network connected across the switching device. The present circuit of FIG. 4 embodying features according to the invention eliminates the need for such a snubber network. It additionally improves the wave shape of the output signal and reduces electromagnetic interference. The circuit may best be described by explaining its operation.

Assume initially that a DC voltage is applied to the input terminals 491 and 492. When the DC voltage is applied, current begins to flow and the capacitor 401 is charged to approximately the applied voltage. The current also flows through an inductor 412 and a resistor 421 to charge a second capacitor 407. The capacitors 401 and 407, resistor 421 and the inductor 412 comprise an input filter. The input filter is designed to limit the transmission of noise between a battery DC voltage source and the converter circuit. The magnitude of the resistor 421 is selected to limit the initial peak inrush current to some desirable value.

The input current flows through the primary winding 473-474 of transformer 471 and through the resistor 433 to the base of the switching transistor 464. This provides the starting current to bias the switching transistor 464 into conduction. The starting current flows through the base-emitter junction of transistor 464 through the resistor 432 back to the input terminal 492. As the starting current flows through the primary winding 473-474 of the power transformer 471, magnetic energy is coupled to winding 478-479, and induces a positive base drive current signal therein. This current is applied, via resistor 435 and diode 453, to the base of transistor 464 to drive it into saturation. Accordingly, due to the regenerative action of the magnetic coupling, the current flowing through transistor 464 increases as a ramp function. The current waveform of this ramp is shown by waveform 501 in FIG. 5, this particular current ramp occurring during the time intervals $t_3$-$t_4$, $t_6$-$t_7$, and $t_9$-$t_{10}$. This ramp current applied to the base of transistor 464 causes it to go into saturation very rapidly. The slope of the ramp current shown by waveform 501 is determined in part by the turns ratio between the winding 473-474 and the winding 476-477. The slope of the ramp is additionally influenced by the magnitude of the input and output voltage and the magnitude of the leakage inductance of the transformer 471. As indicated above with reference to FIG. 1, the leakage inductance is preferably large enough to store approximately one-half of the applied input energy.

Figure 5:
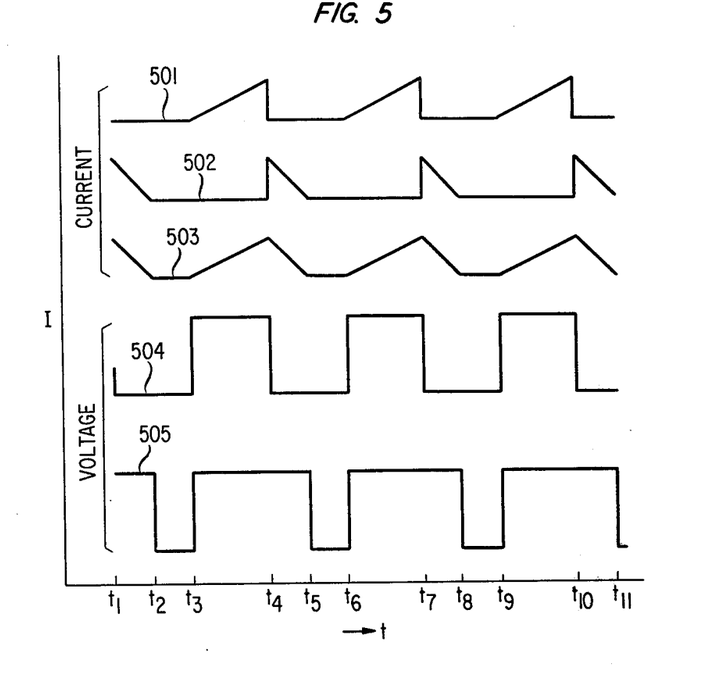
FIG. 5 discloses current and voltage waveforms useful in describing the operation of the converter circuit schematically shown in FIG. 4.

After the transistor 464 is saturated, substantially all of the input voltage appears across the winding 473-474 of the power transformer 471 and its associated leakage inductance. In the illustrative example the voltage drop across the leakage inductance is usually as much as one-half the applied input voltage. A voltage proportional to the voltage across winding 473-474 and determined by the turns ratio appears across the winding 478-479 as shown by waveform 505.

The output current of the converter through the output diode 455 is shown by the waveform 503 in FIG. 5 and, as can be ascertained therefrom, during the time intervals $t_3$-$t_4$, $t_6$-$t_7$, and $t_9$-$t_{10}$, this current is an increasing ramp current. This current is a function of the primary current in winding 473-474 during these time intervals. Energy is stored in the leakage inductance of primary winding 473-474 in response to this ramp current. The voltage across the winding 478-479 is shown by waveform 504. This waveform is a function of the input DC voltage during the time intervals $t_3$-$t_4$, $t_6$-$t_7$, and $t_9$-$t_{10}$. During these time intervals the discharge control diode 454 is reverse biased so that no current flows through the winding 474-475, as shown by waveform 502.

The current through the switching transistor 464 continues to increase until the transistor 465 is switched into its conducting state at the respective times $t_4$, $t_7$, and $t_{10}$ and the base drive is removed from transistor 464. The transistor 465 is controlled by a comparator circuit in a manner to be described hereinbelow.

When the base drive current is removed from the base of the transistor 464, it drops out of saturation and is rapidly biased nonconducting in response to the regenerative action of windings 473-474 and 478-479. When the transistor 464 is turned off, it is apparent from the description above with respect to FIG. 1 that the voltage across the leakage inductance of the transformer 471 reverses. The induced reverse voltage due to the stored energy in the leakage inductance causes a current to flow through winding 474-475 and the diode 454 to the input terminal 491. This current controllably discharges the energy which has been stored in the leakage inductance and, as shown by waveform 502 during time intervals $t_4$-$t_5$ and $t_7$-$t_8$, comprises a discharge ramp of current having a negative slope which flows through the winding 474-475 and the diode 454 to transfer one-half the stored energy to the input capacitors 401 and 407. The other half of this stored energy is transmitted to the output load.

The discharge current which flows through the winding 474-475, as described hereinabove, and causes a current ramp with a negative slope to flow through the output rectifying diode 455 during the time intervals $t_4$-$t_5$ and $t_7$-$t_8$. The rate of decay of the output current is controlled by the magnitude of the leakage inductance and the turns ratio between windings 474-475 and 476-477. The output current waveform flowing through the output rectifying diode, as shown by waveform 503 in FIG. 5, is a ramp having a positive slope when the transistor 464 is conducting, followed by a discharge ramp with a controlled negative slope down to the zero current level during the leakage inductance generated current period. Following termination of the discharge current, current due to the magnetizing inductance flows through 474-475 and resets the magnetic components of transformer 471. Once the transformer core is reset, the transistor 464, is again biased conducting and the operating cycle described above is repeated.

In a conventional oscillator with regenerative feedback the current in the switching transistor is limited by the termination of the base drive due to the saturation characteristics of the power transformer. In the converter circuit disclosed herein, the current of the switching transistor 464 is limited by auxiliary circuitry so that the switching time does not depend solely on the transformer characteristics. Instead, the initiation of regenerative switching is responsive to regulatory circuitry which operates to regulate the output of the converter.

The regulatory circuitry to control switching of the switching transistor 464 includes a comparator circuit which comprises the transistors 461 and 462. The output of the comparator circuit operates through a bias control transistor 465 to control the turnoff of the switching transistor 464. The comparator circuit is energized in response to a shunt regulator which is energized by the DC input voltage applied to input terminals 491 and 492. This shunt regulator comprises the Zener diode 451 and a resistor 422. The breakdown action of the Zener diode 451 generates a constant operating voltage which is applied to the comparator circuit, via resistor 426.

The voltage applied to the base of the transistor 461 of the comparator is determined by a voltage divider circuit coupled across the shunt regulator supply. This voltage divider is comprised of resistors 423, 424, 425, and 443, the junction of resistors 424 and 425 being coupled to the base of transistor 461. The voltage applied to the base of transistor 462 is controlled by another voltage divider circuit coupled across the shunt regulator supply. This voltage divider circuit is comprised of resistors 427, 428, and 432, the junction of resistors 427 and 428 being connected to the base of transistor 462. The voltage at the base of transistor 462 is designed in accordance with the relative impedances of the two above-described voltage dividers to be normally less than the voltage applied to the base of transistor 461. Hence, under normal initial conditions, the transistor 462 is biased conducting and the transistor 461 is biased nonconducting.

As described above, in describing the cycle of operation of the converter circuit, the current flowing through the transistor 464 as a ramp waveform with a positive slope. As the ramp current through the switching transistor 464 increases, the voltage across the resistor 432 in series therewith also increases as a ramp with a positive slope. As this voltage increases, it alters the voltage distribution across the voltage divider resistances 427 and 428 connected thereto and hence the voltage applied to the base of transistor 462 increases linearly. Eventually, the voltage applied to the base of transistor 462 achieves equality with the voltage applied to the base of transistor 461. At this point of equality the transistor 461 begins to conduct and the transistor 462 is biased toward a nonconducting state.

The resistor 443 connected in series with the collector of transistor 462 acts to supply a positive feedback to increase the speed of the switching of the comparator. As the current flow through transistor 462 begins to decrease, voltage across the resistor 443 decreases in response to the decreasing current. The resulting decreasing voltage drop thereacross operates to accelerate the reduction of the voltage applied to the base of transistor 461. Hence, the transistor 461 turns on more rapidly, thus more rapidly decreasing the current flow through transistor 462.

The collector of transistor 461 is coupled to the base of the bias control transistor 465. In response to the conduction of transistor 461, the bias control transistor 465 is biased conducting. The base drive applied to the bias control transistor 465 is limited in magnitude by the impedance of the resistor 426. Transistor 465, which has been turned on in response to the conduction of transistor 461, diverts the base drive current applied to the base of switching transistor 464 and biases it nonconducting. Once the transistor 464 is biased nonconducting, the flux in the power transformer reverses and the transistor 464 is held nonconducting by regenerative action. The transistor 464 is subsequently biased conducting and the normal converter cycle is continued as descried hereinabove.

In order to assure proper cyclic operation of the converter circuit, the transistor 465 must be biased nonconducting as soon as the switching transistor 464 ceases conduction. The increased voltage at the collector of transistor 464, due to its switch to a nonconducting state, is applied, via resistor 431 and diode 452, to the base of transistor 461 to bias it nonconducting. As soon as the transistor 461 ceases conduction, the base drive is removed from transistor 465 and it ceases conduction. Transistor 464 is held off by the reverse voltage of winding 478-479.

The output voltage of the converter is regulated in response to voltage regulation circuitry which operates in conjunction with the above-described comparator circuit. It responds to an overvoltage by accelerating the time at which the switching transistor 464 is biased nonconducting each cycle in order to control the output voltage.

The output voltage of the converter circuit is monitored by an error detector circuit 481. The error detector circuit 481 comprises a reference voltage source and a comparator circuit. These circuits may be either of a discrete or integrated form. The monitoring lead 482 of the error detector circuit 481 is connected to the junction of resistors 437 and 438 which are connected as a voltage divider across the output terminals 483 and 484 of the converter. The voltage at this junction is compared by the error detector 481 with a predetermined reference voltage. If this monitored voltage is higher than the predetermined reference voltage, the error detector generates a current which flows, via lead 485, through the light emitting diode 468.

The light emitting diode 468 is optically coupled to a photo transistor 466 located on the primary side of the converter. The collector-emitter path of the photo transistor 466 couples a junction of the resistors 423 and 424 to the input terminal 492. It is connected so that its conduction controls or modifies the base voltage applied to the transistor 461. When the photo transistor 466 conducts, in response to the light emitting diode 468, the voltage applied to the base of transistor 461 is reduced so that, in accordance with its normal comparator action in limiting the conduction time of transistor 464, the transistor 461 is turned on in response to a lower current level flowing through transistor 464. Hence, the conduction time of the switching transistor 464 is reduced each cycle and the output voltage of the converter is correspondingly reduced to keep it at some desired regulated level.

The output of the converter circuit also includes an overvoltage protection circuit which operates should the above-described voltage regulation circuit fail. The protection circuit comprises a Zener diode 456 and a light emitting diode 469 connected in series and across the output of the converter. In the event of failure of the voltage regulation circuit wherein an overvoltage occurs, a voltage sufficient to break down the Zener diode 456 causes a current to be generated and, hence, the light emitting diode 469 is activated. The light emitting diode 469 is optically coupled to a photo transistor 467 connected to the primary side of the converter. Current flowing through the transistor 467 in response to the light emitting diode 469 biases the transistor 463 conducting. The transistor 463 is connected to divert base drive current from the switching transistor 463 and hence, shuts down the switching transistor 464 to protect against an overvoltage. Due to the high leakage inductance of the power transformer of the converter circuit the voltage reversals at the primary and secondary sides of the transformer occur at different times, respectively. Hence, the regenerative feedback winding must be coupled to the primary side of the converter transformer. It is apparent from the foregoing description that the high leakage inductance measurably improves the waveforms of the generated signals and reduces voltage stresses in the circuit normally due to switching therein.

Figure 6:
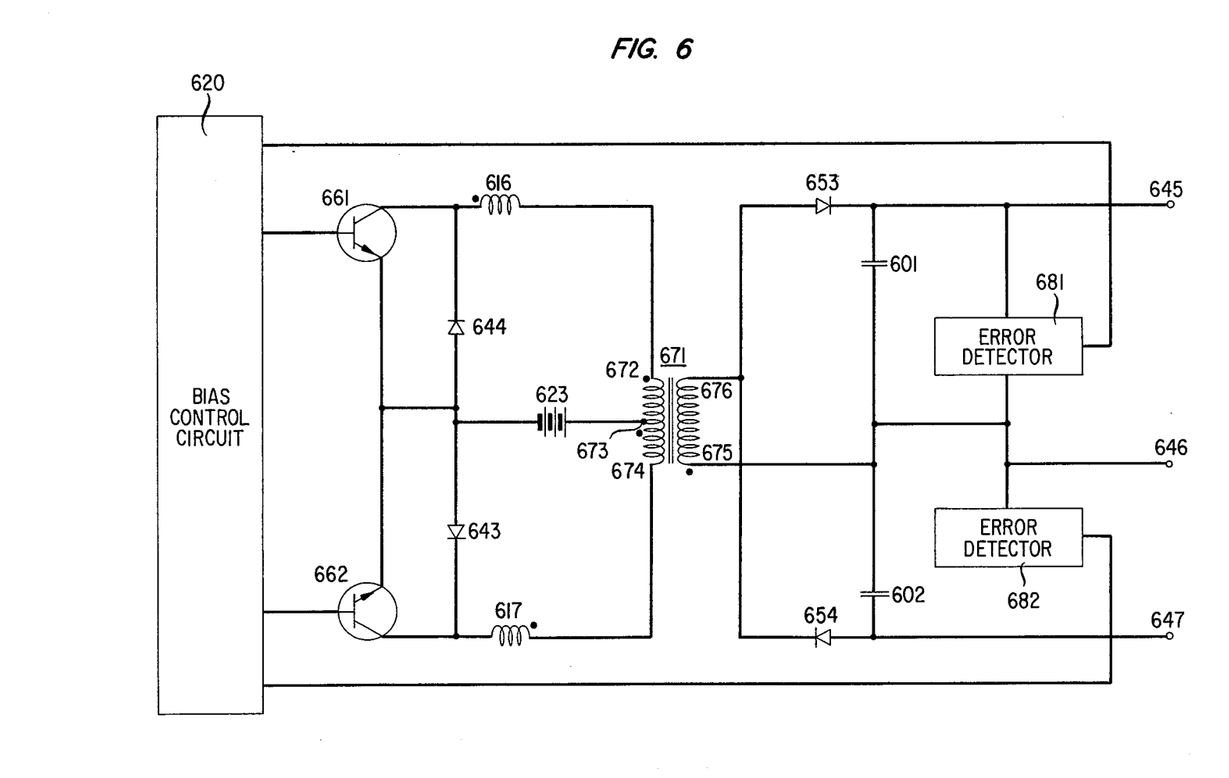
FIG. 6 discloses a double-ended version of the forward type, single-ended converter having dual regulated outputs and advantageously embodying the features illustrative of the invention.

A converter with dual outputs is disclosed in FIG. 6. In this arrangement two single-ended converters embodying the principles of the invention are combined with a single core power transformer to supply two independently regulated outputs. The power transformer 671 is similar to that described above and is schematically shown with an ideal primary winding comprising two series windings 672-673 and 673-674, and a secondary winding 675-676. The large leakage inductance of the transformer is schematically shown as the leakage inductance windings 616 and 617. As shown in FIG. 6, the converter comprises two switching transistors 661 and 662 which are alternately biased conducting for a controlled interval to provide a regulated positive output at terminal 645 and a regulated negative output at terminal 647. Both outputs are referenced to the neutral terminal 646. Control circuitry is designed to alternately turn on transistor 661 and transistor 662 in response to control signals from the independent error detector circuits 681 and 682. The circuit may best be explained by describing a typical cycle of operation.

Assume that the transistor 661 is conducting. Upon initiation of conduction therein a ramp fo current having a positive slope flows from the positive side of the battery 623 through the transformer winding 673-672 through the leakage inductance 616, and through the collector emitter path of transistor 661, to the negative terminal of the battery 623. This ramp of current is shown by the waveform 710 in FIG. 7 for the time interval $t_2$-$t_3$. The current flowing through the leakage inductance 616 induces a voltage in the coupled leakage inductance 617 to back bias the diode 643. At the secondary side of the power transformer 671 a ramp of current having a positive slope flows through the winding 675-676 in a direction to forward bias the diode 653 and charge the capacitor 601. This current ramp is shown by waveform 730 for the interval $t_2$-$t_3$.

Figure 7:
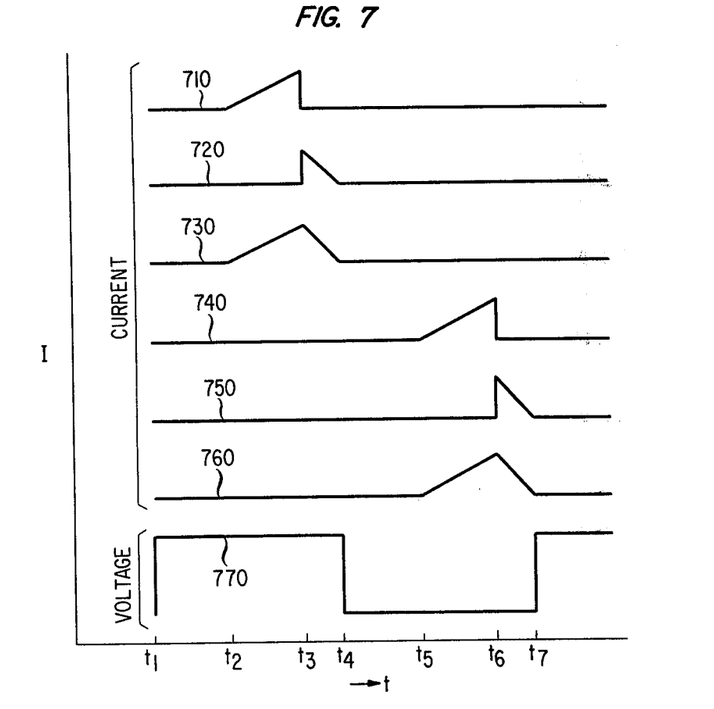
FIG. 7 discloses current and voltage waveforms useful in describing the operation of the converter circuit schematically shown in FIG. 6.

The transistor 661 continues to conduct until a signal is generated within the error detector 681 and supplied to the control circuitry 620 to bias the transistor 661 nonconductive. In response to the nonconduction of transistor 661, the voltage in the respective leakage inductances 616 and 617 reverses and the diode 643 is forward biased. A discharge ramp of current having a negative slope now flows through the diode 643. A source of this current is the energy stored in the leakage inductance 616 which, as described hereinabove, may comprise as much as one-half of the applied input energy. This current flows through the leakage inductance 617 and the transformer winding 674-673 to the positive terminal of the battery 623. The discharge ramp of current on the primary side is shown by waveform 720 for the time interval $t_3$-$t_4$.

Similarly, a discharge ramp of current flows through the secondary winding 675-676 through the diode 653 to the capacitor 601. This discharge ramp of current is shown by waveform 730 for the time interval $t_3$-$t_4$. The output voltage across winding 676-675 is shown by the waveform 770 which has a rectangular pulse form which has positive and negative values for the duration of each successive half cycle which comprises the time intervals $t_1$-$t_4$ and $t_4$-$t_7$, respectively.

Subsequent to the time mark $t_4$ a dead time shown by time interval $t_4$-$t_5$ exists before conduction is initiated in the oppositely phased switching transistor 662. It is during this dead time interval that the core of the transformer 671 is reset in preparation for conduction in the next half cycle. A reset current, in response to the magnetizing inductance of transformer 671, flows through the transformer winding 675-676, the diode 654, and the capacitor 602.

The reset action continues after the transistor 662 is turned on and the cycle of operation of the converter is repeated. In the event that the switching transistor operates at 100 percent duty cycle, the conduction of the alternately switched transistor is sufficient to cause reset of the transformer. This subsequent cycle of operation can readily be surmised by examination of the appropriate waveforms shown in FIG. 7 where waveform 740 during the time interval $t_5$-$t_6$ represents the ramp of current which flows through the switching transistor 662 and waveform 750 during the time interval $t_6$-$t_7$ represents the discharge ramp of current which flows through the diode 644. The waveform 760 represents the output current during the time interval $t_5$-$t_7$ which flows through the output rectifying diode 654. It is readily apparent from the foregoing description that by combining two single-ended converters with a single power transformer that two independent outputs may be generated and independently regulated. The large leakage inductance included in the circuit advantageously limits voltage spikes by controlling the generated current waveshapes.

What is claimed is:

1. A converter circuit comprising:
a power transformer being constructed to have significant leakage inductance between a primary and a secondary winding, said leakage inductance having a reactance magnitude at least one-half the reactance of said primary winding,
means for accepting a voltage source,
a switching device to couple said means for accepting a voltage source to said primary winding,
a unidirectional conducting device connected to said secondary winding and poled to conduct in response to conduction in said switching device, and
means for periodically resetting said leakage inductance comprising a second primary winding tightly coupled to said primary winding and connected to a second unidirectional conducting device poled to conduct in response to a termination of conduction in said switching device whereby current continues to flow in said first unidirectional conducting device in response to conduction in said second unidirectional conducting device in order to control a slope of decay of current in said secondary winding when said switching device ceases conduction.

2. A converter circuit as defined in claim 1 wherein said power transformer further includes a regenerative feedback winding coupled to said primary winding and connected to supply driving signals to said switching devices,
means for monitoring an output voltage of said converter circuit, and
means for initiating regenerative action by turning off said switching device in response to said means for monitoring.

3. A converter circuit as defined in claim 2 wherein said means for initiating regenerative action comprises means for diverting drive signals from said switching device to turn it off and means for disabling said means for diverting drive signals in response to initiation of said regenerative action.

4. A converter circuit comprising:
a power transformer including a primary winding and a secondary winding, said primary and secondary winding being loosely coupled to induce a large leakage inductance between said primary and secondary windings,
means for accepting a source of energy,
switching means for periodically coupling said means for accepting a source of energy to said primary winding,
means for conducting current to reset said leakage inductance in response to termination of conduction in said switching means,
output circuit means for supplying output current including means for controlling conduction responsive initially to said switching means and subsequently to said means for conducting current to reset sad leakage inductance,
whereby an interval decay of output current of said converter is increased to limit high frequency signal components.

5. A converter circuit as defined in claim 4 wherein said primary winding includes a center tap connected to a first terminal of said means for accepting a source of energy and said switching means comprises first and second switching devices connected respectively to opposite ends of said primary winding and connected to a second terminal of said means for accepting a source of energy, and said means for conducting current to reset said leakage inductance comprises first and second unidirectional conducting devices connected in parallel with said first and second switching devices, respectively, and each of said first and second unidirectional conducting devices poled to conduct in a direction opposite nominal flow of current in the respective parallel switching device.

6. A converter circuit comprising:
a power transformer including first and second primary windings connected in series and tightly coupled, a first secondary winding loosely coupled to said first and second primary windings in order to introduce a large leakage inductance between said primary windings and said first secondary winding, the magnitude of the reactance of said leakage inductance being approximately equal to the magnitude of the reactance of said first primary winding,
a first current path including a switching device, said primary winding and means to accept a voltage source,
a second current path including a first unidirectional conducting device, said second primary winding and said means to accept a voltage source,
an output circuit connected to said first secondary winding and including a second unidirectional conducting device,
said first unidirectional conducting device being poled to conduct when said switching device is nonconducting and said second unidirectional conducting device being poled to conduct when said switching device is conducting,
whereby said large leakage inductance discharges stored energy to bias said second unidirectional conducting device in a conducting mode after said switching device has ceased conducting in order to retard decay of current output of the converter.

7. A converter circuit as defined in claim 6 wherein said power transformer further includes a regenerative feedback winding coupled to said primary winding and connected to control the conductivity of said switching device,     means for initiating regenerative action in said regenerative feedback winding including means to divert bias signals from said switching device, and     means for monitoring an output voltage of said converter circuit, said means for initiating regenerative action being responsive to said means for monitoring.

8. A converter circuit as defined in claim 7 wherein said primary and secondary windings are wound on a common magnetic core, said primary windings being bifilar wound and said secondary winding being separated from said primary windings by a dielectric spacer.

9. A converter circuit comprising, a switching device, a transformer including at least a first and second primary winding and at least a first secondary winding, said first and second primary windings being connected in series with each other and being tightly coupled to each other,     means to accept a voltage source,     a voltage limiting diode and a rectifying diode,     said switching device, said first primary winding, and said means to accept being connected in series to form a first closed loop,     said voltage limiting diode, said second primary winding, and said means to accept being connected in series to form a second closed loop, said voltage limiting diode being poled to block when said switching device is conducting,     said secondary winding being loosely coupled to said first and second primary windings in order to introduce significant leakage inductance between said primary and said secondary windings,     said significant leakage inductance having a reactance magnitude sufficient to absorb approximately one half of the energy supplied by the voltage source, and     a rectifying diode in series with said secondary winding and poled to conduct simultaneously with conduction in said switching device whereby the leakage inductance of said first and second primary windings permits a controlled discharge of energy stored in the transformer to limit the rate of current decay in said secondary winding as energy is discharged through said voltage limiting diode.

* * * * *

UNITED STATES PATENT AND TRADEMARK OFFICE
CERTIFICATE OF CORRECTION

PATENT NO. : 4,007,413
DATED : February 8, 1977
INVENTOR(S) : Phil Dewey Fisher and Richard Howard Hock It is certified that error appears in the above-identified patent and that said Letters Patent are hereby corrected as shown below:

Column 2, line 1, "electromatic" should read --electromagnetic--.

Column 3, line 33, "1" should read --15--.

Column 5, line 39, "in" should read --is--.

Column 8, line 61, "descried" should read --described--.

Column 10, line 26, "fo" should read --of--.

Column 12, line 18, (Claim 4) "sad" should read --said--;
line 49, (Claim 6) before "primary" insert --first--.

Signed and Sealed this

Twenty-sixth Day of April 1977

[SEAL]

Attest:

RUTH C. MASON
Attesting Officer

C. MARSHALL DANN
Commissioner of Patents and Trademarks